Sept. 29, 1964    D. R. HOLM    3,150,779
RAILWAY CAR SHOCK ABSORBING SYSTEM
Filed May 11, 1962    3 Sheets-Sheet 2
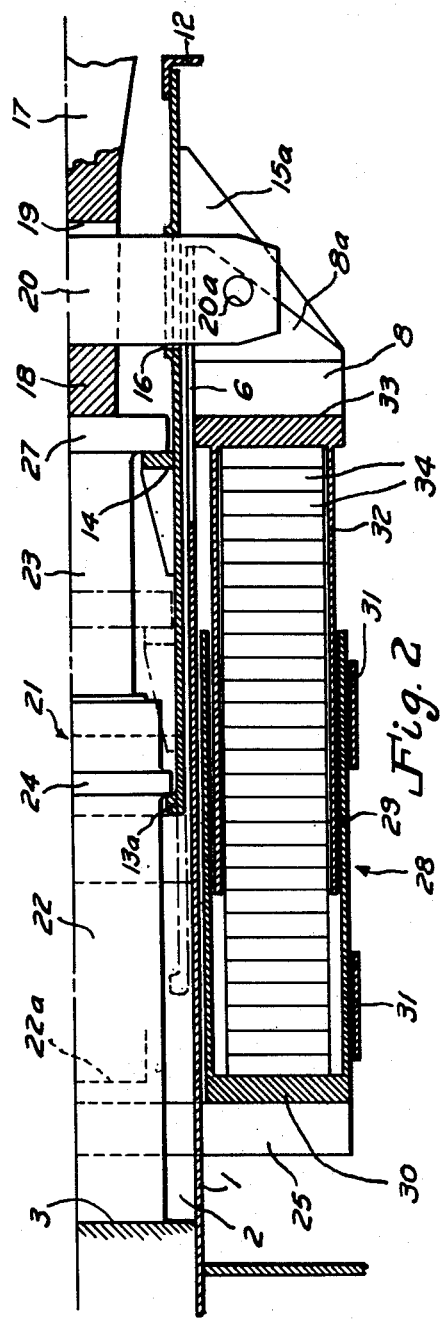
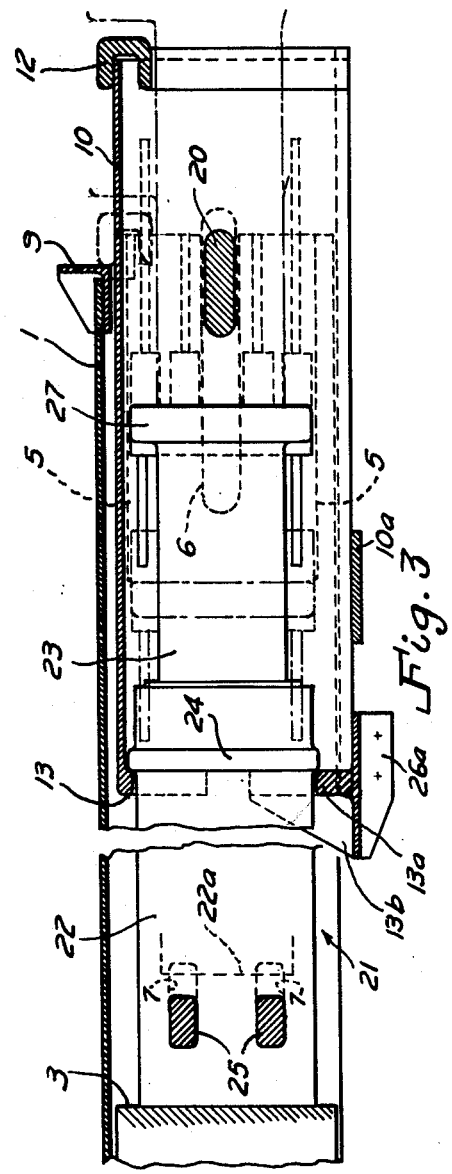
INVENTOR.
Donald R. Holm
BY
Att'y.

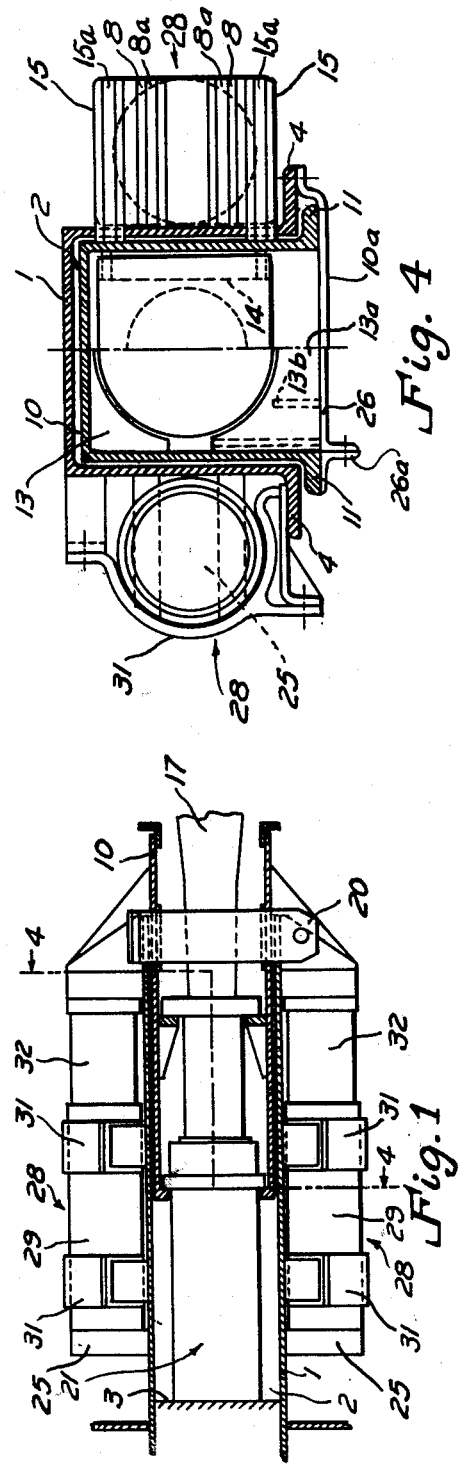

Sept. 29, 1964   D. R. HOLM   3,150,779
RAILWAY CAR SHOCK ABSORBING SYSTEM
Filed May 11, 1962   3 Sheets-Sheet 3
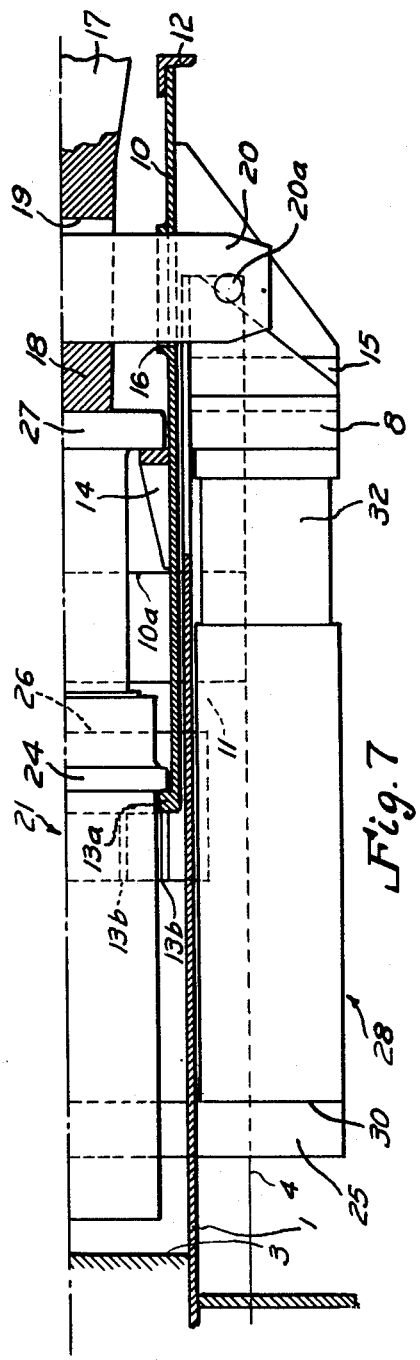
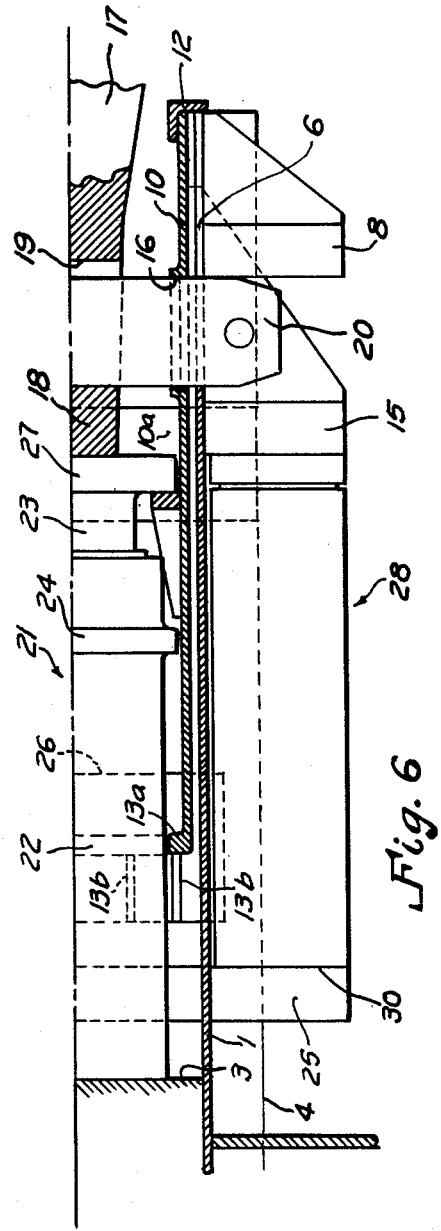
INVENTOR.
Donald R. Holm
BY
Atty.

United States Patent Office 3,150,779
Patented Sept. 29, 1964

3,150,779
RAILWAY CAR SHOCK ABSORBING SYSTEM
Donald R. Holm, Markham, Ill., assignor to W. H. Miner, Inc., Chicago, Ill., a corporation of Delaware
Filed May 11, 1962, Ser. No. 193,991
9 Claims. (Cl. 213—8)

My present invention relates generally to railway cars and more particularly to a shock absorbing system for a railway car.

All railway cars, including freight cars, are repeatedly subjected to impact or buff forces and draft forces. When railway cars are being made up into trains, the couplers are moved into impact with each other in effecting coupling. Then, as the cars tend to stretch apart on starting or acceleration of the engine, the couplers are subjected to draft forces. And, when the cars tend to crowd together on slowing or stopping of the engine, the couplers are again subjected to impact or buff forces. In these circumstances, severe stresses are set up in the couplers and substantial shocks are imparted to the cars and the contents thereof.

The primary object of my present invention is to provide an improved shock absorbing system for railway cars to absorb buff and draft forces received by the couplers of the cars.

It is another object of my present invention to provide a shock absorbing system that is adapted to be readily installed in a conventional railway car having a center sill.

Another object of my present invention is to provide a shock absorbing system for railway cars comprising primary shock absorbing means for absorbing shocks imparted to the couplers and secondary shock absorbing means for assisting the primary shock absorbing means in absorbing such shocks.

It is still another object of my present invention to provide a shock absorbing system for railway cars comprising primary shock absorbing means for absorbing buff forces received by the couplers and secondary shock absorbing means operable, either in conjunction with the primary shock absorbing means or independently in the event of failure of the latter, to absorb such forces.

A further object of my present invention is to provide a shock absorbing system for railway cars comprising primary shock absorbing means for absorbing buff forces received by the couplers and secondary shock absorbing means for absorbing both buff and draft forces received by the couplers.

I propose to accomplish the afore-mentioned objects by supporting each coupler at the outer end of a sill member slidably mounted in the stationary sill of the railway car. Hydraulic shock absorber means is disposed within the slidable sill and rubber shock absorbing means is arranged along the sides of the stationary sill. The rubber shock absorbing means, the hydraulic shock absorber means and the slidable and stationary sills are operatively associated in such a manner that buff forces received by the coupler are absorbed by both the hydraulic and rubber shock absorbing means and draft forces are absorbed by the rubber shock absorbing means.

Other objects, advantages and modifications of my invention will become apparent or be obvious from a consideration of the following description when taken in conjunction with the appended drawings in which:

FIGURE 1 is a plan view of the shock absorbing system of my present invention, with certain parts being shown in horizontal section;

FIGURE 2 is an enlarged plan view of one-half of the shock absorbing system of FIGURE 1, with certain parts being shown in horizontal axial section;

FIGURE 3 is an enlarged vertical sectional view of the shock absorbing system of FIGURE 1, taken along the longitudinal axis thereof;

FIGURE 4 is an enlarged vertical sectional view of my shock absorbing system, taken along the line 4—4 in FIGURE 1;

FIGURE 5 is an enlarged side elevational view of the shock absorbing system of FIGURE 1;

FIGURE 6 is an enlarged plan view of one-half of the shock absorbing system of FIGURE 1, with certain parts being broken away in horizontal section, and with the parts being shown in one operative position; and FIGURE 7 is a plan view similar to FIGURE 6 showing the parts of the hydraulic shock absorbing system in a different operative position.

Referring now to the drawings, there is shown the shock absorber system of my present invention which is adapted to be operatively associated with the longitudinally extending, inverted, generally U-shaped, center sill 1 of a railway car. The center sill 1 is stationary relative to the railway car and, as shown in FIGURE 1, defines the usual draft gear pocket 2 that is open at the forward end and closed at the rearward end by a suitable transverse center filler member 3. Extending along the lower longitudinal edges of the vertical walls of the stationary sill 1, as shown in FIGURE 4, are laterally outwardly directed supporting flange portions 4. At the forward end of the stationary sill 1, as shown in FIGURES 3 and 5, each vertical wall is formed with vertically spaced, longitudinally extending, upper and lower slots 5 and a central slot 6 that are open at their forward ends. At the rearward end of the draft gear pocket 2, each vertical wall of sill 1 is formed with a pair of vertically spaced, longitudinally extending, slots 7. The slots 5, 6 and 7 are adapted to slidably receive members to be described hereinafter. As shown in FIGURES 4 and 5, laterally outwardly extending force resisting members or stationary wings 8, reinforced by horizontal angle flange portions 8a, are secured to the outboard sides of the vertical walls of the stationary sill 1 intermediate the series of slots 5 and 6. Stop means in the form of a flange 9 is secured to the horizontal wall of the sill 1 at the forward end thereof.

Slidably mounted in the pocket 2 of the stationary sill 1 is a longitudinally extending, inverted, generally U-shaped sill 10. Integral with the lower longitudinally extending edges of the vertical walls of the sliding sill 10, as shown in FIGURE 4, are laterally outwardly directed flange portions 11. As shown in FIG. 3, the sliding sill 10 projects outwardly beyond the forward end of the stationary sill 1 and has secured to its forward end stop means in the form of a collar member 12 adapted to cooperate with the stationary sill flange 9. The rearward end of the sliding sill 10 is formed with a depending transverse force transmitting wall 13 having a semi-cylindrical opening therein. Intermediate of the ends of the sill 10, as shown in FIGURE 2, vertically arranged, laterally inwardly projecting force transmitting members or lugs 14 are secured to the inboard sides of the vertical walls, and, as shown in FIGURES 4 and 5, vertically spaced, laterally outwardly extending force transmitting members or pusher wings 15, reinforced by horizontal angle flange portions 15a, are secured to the outboard sides of the vertical walls. The pusher wings 15 are slidably received and guided by the upper and lower slots 5 formed in the stationary sill 1. Forwardly of the pusher wings 15, each vertical wall of the sill 10 is formed with a central slot 16 that aligns horizontally with the central slots 6 in the stationary sill 1. Sliding support for the sill 10 is provided by a transverse carrier bracket 10a bolted or otherwise secured at its ends to the flange portions 4 of the stationary sill 1 and extending below and in sliding contact with the flanges 11 of the sliding sill 10 as shown in the right-hand sectional view of FIGURE 4.

Arranged at the forward end of the sliding sill 10, as shown for example in FIGURE 2, is a coupler member 17 having a shank portion 18 that extends rearwardly. The shank portion 18 is formed with a conventional transverse slot 19 through which extends a transverse draft key 20. The slot 19 is slightly wider than the width of the draft key 20 to permit limited pivotal movement of the coupler 17 in a horizontal plane relative to the draft key 20. The ends of the draft key 20 project through the slots 16 in the sliding sill 10 and are slidably received and guided by the central slots 6 in the stationary sill 1. The slots 16 are slightly wider than the draft key 20 to permit a small amount of longitudinal movement of the draft key 20 relative to the sliding sill 10. The draft key 20 is retained in position by conventional locking pins (not shown) disposed in openings 20a at the ends of the key 20. Within limits and in a manner to be described more fully hereinafter, the sliding sill 10 is adapted to move back and forth within the stationary sill 1 in response to buff and draft forces applied to the coupler 17.

To absorb buff and draft forces received by the coupler 17, I provide both primary and secondary shock absorber means. The primary shock absorber means, as shown for example in FIGURE 2, comprises a longitudinally extending hydraulic shock absorber unit, indicated generally by the reference numeral 21, which is arranged within and at the rearward end of the sliding sill 10. The hydraulic shock absorber unit 21 is of conventional construction and comprises a cylinder 22 with a pressure chamber 22a and a piston rod 23. The hydraulic cylinder 22 extends through the opening in the transverse wall 13 of the sliding sill 10 and near its forward end is provided with a force transmitting member or collar 24 that is disposed forwardly of the wall 13. The hydraulic unit 21 near its rear end carries and is carried by a pair of vertically spaced, transversely extending combined force transmitting and resisting members, in the form of pusher bars 25, that are secured in and extend through the cylinder 22. The free ends of the pusher bars 25, as shown in FIGURE 3, are slidably received in the slots 7 formed in the stationary sill 1. Sliding support for the forward end of the cylinder 22 of the hydraulic shock absorber unit 21 is provided by a suitable bracket 26 secured at its ends through angle members 26a to the lateral flanges 11 of the sliding sill 10. Secured to and upstanding from the bracket 26, as shown in the left-hand sectional view of FIGURE 4, is a vertical support member 13a having a semi-cylindrical opening therein which, together with the depending wall 13, embraces the cylinder 22 and constitutes a force transmitting means engageable with the cylinder as will be described hereinafter. Suitable reinforcing gussets 13b are welded to bracket 26 and support member 13a to rigidify the latter. The piston rod 23 at its forward end is provided with a force transmitting member or collar 27 that is disposed forwardly of the sliding sill lugs 14 at the rearward end of the coupler shank 18.

Cooperating with the above described primary shock absorbing means is secondary shock absorbing means comprising a pair of longitudinally extending, telescoping rubber shock absorbing columns, each indicated generally by the reference numeral 28, disposed, as shown in FIGURE 1, on opposite sides of the hydraulic unit 21 outwardly of the stationary sill 1. As shown in FIGURE 2, the rubber shock absorbing columns 28 each comprise an outer cylinder 29 with a rear end wall 30 that abuts the forward faces of the adjacent pusher bars 25. The outer cylinders 29 are slidably mounted along the outboard sides of the stationary sill 1 by means of longitudinally spaced vertical bracket assemblies 31 (omitted for clarity in FIGURES 6 and 7). The bracket assemblies 31, as shown in FIGURE 4, are formed with inner semi-circular bearing surfaces to slidably seat the outer cylinders 29 and are suitably secured at their upper and lower ends, respectively, to the vertical walls and flange portions 4 of the stationary sill 1. Slidably received in each outer cylinder 29 is an inner cylinder 32 with a forward closed end 33 that is adapted, as shown in FIGURE 5, to normally abut the rearward faces of the adjacent sets of stationary wings 8 and pusher wings 15. Disposed within each pair of cylinders 29 and 32, as shown in FIGURE 2, are a plurality of rubber pad members 34 arranged transversely of the longitudinal axis of the rubber shock absorbing columns 28. There are many commercial forms of rubber pads that are adapted for use in my present invention. By way of example, each pad 34 might consist of a rubber disc with metal plates bonded to the opposing faces. The rubber pad members 34 serve to absorb shocks transmitted to the ends of the telescoping columns 28.

When the coupler 17 is not being subjected to either buff or draft forces, my shock absorbing system assumes the neutral position illustrated in FIGURES 1 through 5. I shall now describe the manner in which my system cushions both buff and draft forces applied to the coupler 17.

When the coupler member 17, as shown in FIGURE 2, is subjected to impact or buff forces, the shank portion 18 engages the forward end of the hydraulic piston rod 23 and moves the latter rearwardly. Since the rearward end of the hydraulic cylinder 22 is seated against the stationary transverse center filler member 3, rearward movement of the piston rod 23 actuates the hydraulic shock absorber unit 21 whereupon the latter serves to absorb the buff forces applied to the coupler 17.

As the piston rod 23 moves rearwardly, the piston rod collar 27 engages and moves the sliding sill lugs 14 rearwardly from the solid line position toward the dotted line position shown in FIGURE 2. This movement of the lugs 14 causes the sliding sill 10 and the movable pusher wings 15 associated therewith to be moved rearwardly. The pusher wings 15 are thus urged against the forward ends 33 of the inner cylinders 32 of the telescoping rubber shock absorbing columns 28. Since rearward movement of the outer cylinders 29 of the telescoping columns 28 is resisted by the pusher bars 25, which in buff lie at the rear ends of the slots 7 formed in the stationary sill 1, the inner cylinders 32 move axially inwardly of the outer cylinders 29 thus compressing the rubber pad members 34. The telescoping rubber shock absorbing columns 28, when actuated in the manner described, serve to cooperate with the hydraulic shock absorber unit 21 in absorbing the buff forces applied to the coupler member 17.

In buff, the flange 9 at the forward end of the stationary sill 1, as shown in FIGURE 3, is engageable by the collar member 12 at the forward end of the sliding sill 10 for stopping and limiting rearward movement of the latter. Thus, the longitudinal spacing of the members 9 and 12 when the system is in a neutral position predetermines maximum buff travel of the operatively associated parts of my shock absorbing system. FIGURE 6 shows the parts of my system in a maximum or full buff operative position. As the buff forces are removed from coupler 17, the telescoped rubber shock absorbing columns 28 will expand and urge the associated pusher wings 15, sliding sill 10, sill lugs 14 and piston rod collar 27 forwardly from the dotted line position to the solid line position shown in FIGURE 2, thereby returning the system to a neutral position.

When the coupler member 17, as shown in FIGURE 2, is subjected to draft forces, the coupler shank 18 pulls the draft key 20 forwardly against the forward edge of the sliding sill slot 16 thus moving the sliding sill 10 forwardly. As the sliding sill 10 moves forwardly, the vertical sill lugs 14 engage and pull the piston rod collar 27 forwardly and the rearward wall members 13 and 13a of the sliding sill 10 engage and pull the hydraulic cylinder collar 24 forwardly. During this movement, the hydraulic shock absorbing unit 21 is inactivated or neutralized and serves as a unitary member or yoke for pulling the two rear pusher bars 25 forwardly. As the bars 25 are pulled forwardly, the outer ends thereof push forwardly against the rear walls 30 of the outer cylinders 29 of the telescoping rubber shock absorbing columns 28. Since forward movement of the inner cylinders 32 of the telescoping units 28 is resisted by the stationary wings 8 at the forward end of the stationary sill 1, the outer cylinders 29 move axially over the inner cylinders 32 thus compressing the rubber pad members 34. When the telescoping rubber shock absorber columns 28 are actuated in this manner in a forward direction, they serve to absorb the draft forces applied to the coupler member 17 and permit starting of a long line of trains.

In draft, the forward ends of the slots 7 at the rearward end of the stationary sill 1, as shown in FIG. 3, are engageable by the forward edges of the pusher bars 25 for stopping and limiting forward movement of the latter. Thus, the length of slots 7 predetermines maximum draft travel of the operatively associated parts of my shock absorbing system. Since draft and buff travel are controlled independently, maximum draft travel relative to maximum buff travel can be varied to provide a wide range of desired shock absorbing characteristics. FIGURE 7 shows the parts of my system in a maximum or full draft operative position. As the draft forces are removed from coupler 17, the telescoped rubber shock absorbing columns 28 will expand and urge the associated pusher bars 25, hydraulic unit 21 and sliding sill 19 rearwardly, thereby returning the system to a neutral position.

From the foregoing description, it will be apparent to those skilled in the art that I have provided an improved shock absorbing system for railway cars especially adapted to cushion buff and draft forces imposed on the couplers of the cars. In the preferred embodiment of my present invention, buff forces are absorbed by hydraulic shock absorbing means and both buff and draft forces are absorbed by rubber shock absorbing means thus saving the hydraulic unit from approximately one-half the normal working it would otherwise encounter. By arranging the hydraulic and rubber shock absorbing means in parallel, my system will cushion high speed impacts of substantial magnitude. In addition, in the event of operational failure of the hydraulic shock absorbing means for any reason, the rubber shock absorbing means is operable alone to cushion impact and draft forces, thereby insuring adequate cushioning of shocks at all times and under all circumstances. Finally, it is to be noted that my shock absorbing system may be readily installed in a conventional railway car having a center sill.

While I have illustrated preferred forms of my present invention, I do not intend to be limited thereto, except insofar as the claims are so limited, since certain modifications coming within the scope of the invention will be suggested to those skilled in the art, particularly in the light of my disclosure.

I claim:

1. In a railway car having a longitudinally extending stationary sill with an open forward end, the combination of a longitudinally extending movable sill slidable longitudinally in said stationary sill and having a portion projecting forwardly thereof, coupler means carried at the forward end of said slidable sill, laterally outwardly extending pusher wings secured to said slidable sill at the forward end thereof, a hydraulic shock absorber disposed in said slidable sill and having a hydraulic cylinder and a forwardly projecting hydraulic piston rod, said sliding sill having a rearward transverse wall with an opening therein for slidably receiving said hydraulic cylinder, means on said stationary sill for normally seating the rearward end of said hydraulic cylinder, transversely extending pusher bars carried by said hydraulic cylinder at the rearward end thereof, collar means on said hydraulic cylinder adapted to be engaged by said rearward wall of said sliding sill, collar means on the forward end of said hydraulic piston rod adjacent said coupler means, inwardly projecting lug means secured to said sliding sill immediately rearwardly of said hydraulic piston rod collar means for engagement therewith, laterally outwardly extending stationary wings secured to said stationary sill at the forward end thereof, resilient shock absorbing means arranged between said pusher bars and said stationary and pusher wings, said coupler means in response to buff forces applied thereto being engageable with the forward end of said hydraulic piston rod for actuating said hydraulic shock absorber whereupon the latter serves to absorb the buff forces, said hydraulic piston rod collar means simultaneously being engageable with said lug means for moving said sliding sill and said pusher wings associated therewith rearwardly thereby compressing said resilient shock absorbing means between said pusher wings and said pusher bars whereupon said resilient shock absorbing means serves to cooperate with said hydraulic shock absorber in absorbing the buff forces, and said coupler means in response to draft forces applied thereto effecting movement of said slidable sill forwardly causing said rearward wall of said sliding sill to engage said hydraulic cylinder collar means for moving said hydraulic cylinder and said pusher bars associated therewith forwardly thereby compressing said resilient shock absorbing means between said pusher bars and said stationary wings whereupon said resilient shock absorbing means serves to absorb the draft forces.

2. In a railway car having a longitudinally extending stationary sill with an open forward end, the combination of a longitudinally extending movable sill slidable longitudinally in said stationary sill and having a portion projecting forwardly thereof, coupler means carried at the forward end of said slidable sill, said stationary sill having longitudinally extending slots formed therein at the forward end thereof, laterally outwardly extending pusher wings secured to said slidable sill, said pusher wings being slidably received in and projecting through the slots at the forward end of said stationary sill, a hydraulic shock absorber disposed in said slidable sill and having a hydraulic cylinder and a forwardly projecting hydraulic piston rod, said sliding sill having a rearward transverse wall with an opening therein for slidably receiving said hydraulic cylinder, means on said stationary sill for normally seating the rearward end of said hydraulic cylinder, said stationary sill having longitudinally extending slots formed therein immediately forwardly of said seating means at the rearward end of said stationary sill, transversely extending pusher bars carried by said hydraulic cylinder at the rearward end thereof, said pusher bars being slidably received in and projecting through the slots at the rearward end of said stationary sill, collar means on said hydraulic cylinder being engageable by said rearward wall of said sliding sill, collar means on the forward end of said hydraulic piston rod adjacent said coupler means, inwardly projecting lug means secured to said sliding sill immediately rearwardly of said hydraulic piston rod collar means for engagement therewith, laterally outwardly extending stationary wings secured to said stationary sill at the forward end thereof, resilient shock absorbing means arranged between said pusher bars and said stationary and pusher wings, said coupler means in response to buff forces applied thereto being engageable with the forward end of said hydraulic piston rod for actuating said hydraulic shock absorber whereupon the latter serves to absorb the buff forces, said hydraulic piston rod collar means simultaneously being engageable with said lug means for moving said sliding sill and said pusher wings associated therewith rearwardly thereby compressing said resilient shock absorbing means between said pusher wings and said pusher bars whereupon said resilient shock absorbing means serves to cooperate with said hydraulic shock absorber in absorbing the buff forces, and said coupler means in response to draft forces applied thereto effecting movement of said slidable sill forwardly causing said rearward wall of said sliding sill to engage said hydraulic cylinder collar means for moving said hydraulic cylinder and said pusher bars associated therewith forwardly thereby compressing said resilient shock absorbing means between said pusher bars and said stationary wings whereupon said resilient shock absorbing means serves to absorb the draft forces.

3. In a railway car having a longitudinally extending stationary sill with an open forward end, the combination of a longitudinally extending movable sill slidable longitudinally in said stationary sill and having a portion projecting forwardly thereof, coupler means carried at the forward end of said slidable sill, said stationary sill having longitudinally extending slots formed therein at the forward end thereof, laterally outwardly extending pusher wings secured to said slidable sill, said pusher wings being slidably received in and projecting through the slots at the forward end of said stationary sill, a hydraulic shock absorber disposed in said slidable sill and having a hydraulic cylinder and a forwardly projecting hydraulic piston rod, said sliding sill having a rearward transverse wall with an opening therein for slidably receiving said hydraulic cylinder, means on said stationary sill for normally seating the rearward end of said hydraulic cylinder, said stationary sill having longitudinally extending slots formed therein immediately forwardly of said seating means at the rearward end of said stationary sill, transversely extending pusher bars carried by said hydraulic cylinder at the rearward end thereof, said pusher bars being slidably received in and projecting through the slots at the rearward end of said stationary sill, collar means on said hydraulic cylinder engageable by said rearward wall of said sliding sill, collar means on the forward end of said hydraulic piston rod adjacent said coupler means, inwardly projecting lug means secured to said sliding sill immediately rearwardly of said hydraulic piston rod collar means for engagement therewith, laterally outwardly extending stationary wings secured to said stationary sill at the forward end thereof, telescoping shock absorbing columns arranged along the sides of said stationary sill, said telescoping columns each having a first cylinder with a rearward closed end abutting said pusher bars and a second cylinder with a forward closed end normally abutting said stationary wings and said pusher wings, resilient means disposed within the confines of said first and second telescoping cylinders, said coupler means in response to buff forces applied thereto being engageable with the forward end of said hydraulic piston rod for actuating said hydraulic shock absorber whereupon the latter serves to absorb the buff forces, said hydraulic piston rod collar means simultaneously being engageable with said lug means for moving said sliding sill and said pusher wings associated therewith rearwardly thereby compressing said telescoping shock absorbing columns between said pusher wings and said pusher bars whereupon said telescoping shock absorbing columns serve to cooperate with said hydraulic shock absorber in absorbing the buff forces, and said coupler means in response to draft forces applied thereto effecting movement of said slidable sill forwardly causing said rearward wall of said sliding sill to engage said hydraulic cylinder collar means for moving said hydraulic cylinder and said pusher bars associated therewith forwardly thereby compressing said telescoping shock absorbing columns between said pusher bars and said stationary wings whereupon said telescoping shock absorbing columns serve to absorb the draft forces.

4. In a railway car having a longitudinally extending inverted generally U-shaped stationary sill with an open forward end, the combination of a longitudinally extending inverted generally U-shaped movable sill slidable longitudinally in said stationary sill and having a portion projecting forwardly thereof, coupler means carried at the forward end of said slidable sill, said stationary sill having vertically spaced longitudinally extending slots formed in each vertical wall thereof at the forward end of said sill, vertically spaced laterally outwardly extending pusher wings secured to the outboard sides of the vertical walls of said slidable sill, said pusher wings being slidably received in and projecting through the slots at the forward end of said stationary sill, a hydraulic shock absorber disposed in said slidable sill and having a hydraulic cylinder and a forwardly projecting hydraulic piston rod, said sliding sill having a rearward transverse wall with an opening therein for slidably receiving said hydraulic cylinder, means on said stationary sill for normally seating the rearward end of said hydraulic cylinder, said stationary sill having vertically spaced longitudinally extending slots formed in each vertical wall thereof immediately forwardly of said seating means at the rearward end of said stationary sill, vertically spaced transversely extending pusher bars secured in said hydraulic cylinder at the rearward end thereof, said pusher bars being slidably received in and projecting through the slots at the rearward end of said stationary sill, a collar on the forward end of said hydraulic cylinder engageable by said rearward wall of said sliding sill, a collar on the forward end of said hydraulic piston rod adjacent said coupler means, lugs secured to the inboard sides of the vertical walls of said sliding sill immediately rearwardly of said hydraulic piston rod collar for engagement therewith, vertically spaced laterally outwardly extending stationary wings secured to the outboard sides of the vertical walls of said stationary sill at the forward end thereof, telescoping shock absorbing columns arranged along the sides of said stationary sill, said telescoping columns each having a first cylinder with a rearward closed end abutting said pusher bars and a second cylinder with a forward closed end normally abutting said stationary wings and said pusher wings, rubber resilient means disposed within the confines of said first and second telescoping cylinders, said coupler means in response to buff forces applied thereto being engageable with the forward end of said hydraulic piston rod for actuating said hydraulic shock absorber whereupon said hydraulic shock absorber serves to absorb the buff forces, said hydraulic piston rod collar simultaneously being engageable with said lugs for moving said sliding sill and said pusher wings associated therewith rearwardly thereby compressing said telescoping shock absorbing columns between said pusher wings and said pusher bars whereupon said telescoping shock absorbing columns serve to cooperate with said hydraulic shock absorber in absorbing the buff forces, and said coupler means in response to draft forces applied thereto effecting movement of said slidable sill forwardly causing said rearward wall of said sliding sill to engage said hydraulic cylinder collar for moving said hydraulic cylinder and said pusher bars associated therewith forwardly thereby compressing said telescoping shock absorbing columns between said pusher bars and said stationary wings whereupon said telescoping shock absorbing columns serve to absorb the draft forces.

5. The combination of claim 4 characterized by the provision of first stop means on the forward end of said slidable sill and second stop means on the forward end of said stationary sill being engageable by said first stop means for limiting rearward movement of said sliding sill, and wherein forward movement of said pusher bars is limited by the width of the slots in the stationary sill at the rearward end thereof.

6. In a railway car having a longitudinally extending stationary sill, the combination of a longitudinally extending movable sill slidable longitudinally in the stationary sill, coupler means carried at the one end of said slidable sill, hydraulic shock absorber means disposed in said slidable sill, resilient shock absorbing means mounted outboard of the stationary sill along at least one side thereof, said coupler means and said slidable sill being so arranged that buff forces applied to said coupler means are transmitted by the latter and said slidable sill to said hydraulic shock absorber means and said resilient shock absorber means where they are absorbed, and said coupler means, said slidable sill and said hydraulic shock absorber means being so arranged that draft forces applied to said coupler means are transmitted by said slidable sill and at least a part of said hydraulic shock absorber means to said resilient shock absorber means where they are absorbed.

7. In a railway car having a longitudinally extending stationary sill, the combination of a longitudinally extending movable sill slidable longitudinally in the stationary sill, coupler means carried at the one end of said slidable sill, hydraulic shock absorber means disposed lengthwise in said slidable sill, resilient shock absorbing means mounted outboard of the stationary sill lengthwise along each side thereof, said coupler means and said slidable sill being so arranged that buff forces applied to said coupler means are transmitted by the latter and said slidable sill to the one ends of said hydraulic shock absorber means and said resilient shock absorber means where they are absorbed, and said coupler means, said slidable sill and said hydraulic shock absorber means being so arranged that draft forces applied to said coupler means are transmitted by said slidable sill and at least a part of said hydraulic shock absorber means to the other end of said resilient shock absorber means where they are absorbed.

8. In a railway car having a longitudinally extending stationary sill, the combination of a longitudinally extending movable sill slidable longitudinally in the stationary sill, coupler means carried at the one end of said slidable sill, a hydraulic shock absorber disposed in said slidable sill and having a hydraulic cylinder and a forwardly projecting hydraulic piston rod, means on said stationary sill for normally seating the rearward end of said hydraulic cylinder, combined force transmitting and resisting means carried by said hydraulic cylinder at the rearward end thereof, force transmitting means on said slidable sill at the forward end thereof, force resisting means on said stationary sill at the forward end thereof, resilient shock absorber means arranged between said combined force transmitting and resisting means and said force transmitting means and said force resisting means, said coupler means in response to buff forces applied thereto effecting actuation of said hydraulic shock absorber whereupon the latter serves to absorb the buff forces, said coupler means in response to buff forces applied thereto simultaneously effecting rearward movement of said sliding sill and said force transmitting means thereon thereby compressing said resilient shock absorber means between said force transmitting means and said combined force transmitting and resisting means whereupon said resilient shock absorber means serves to cooperate with said hydraulic shock absorber in absorbing the buff forces, said coupler means in response to draft forces applied thereto effecting movement of said slidable sill forwardly, and means on said slidable sill for moving said hydraulic cylinder and said combined force transmitting and resisting means associated therewith forwardly when said slidable sill is moved forwardly thereby compressing said resilient shock absorber means between said combined force transmitting and resisting means and said force resisting means whereupon said resilient shock absorber means serves to absorb the draft forces.

9. In a railway car having a longitudinally extending stationary sill with an open forward end, the combination of a longitudinally extending movable sill slidable longitudinally in said stationary sill and having a portion projecting forwardy thereof, coupler means carried at the forward end of said slidable sill, force transmitting means on said slidable sill at the forward end thereof, force transmitting means on said slidable sill at the rearward end thereof, a hydraulic shock absorber disposed in said slidable sill and having a hydraulic cylinder and a forwardly projecting hydraulic piston rod, means on said stationary sill for normally seating the rearward end of said hydraulic cylinder, combined force transmitting and resisting means carried by said hydraulic cylinder at the rearward end thereof, collar means on said hydraulic cylinder engageable by said force transmitting means on said slidable sill at the rearward end thereof, collar means on the forward end of said hydraulic piston rod adjacent said coupler means, force transmitting means on said slidable sill adjacent to and immediately rearwardly of said hydraulic piston rod collar means for engagement therewith, force resisting means on said stationary sill, resilient shock absorber means arranged between said combined force transmitting and resisting means and said force transmitting means on said slidable sill at the forward end thereof and said force resisting means, said coupler means in response to buff forces applied thereto being engageable with the forward end of said hydraulic piston rod for actuating said hydraulic shock absorber whereupon the latter serves to absorb the buff forces, said hydraulic piston rod collar means simultaneously being engageable with said force transmitting means on said slidable sill adjacent said hydraulic piston rod collar means for moving said sliding sill and said force transmtting means on said slidable sill at the forward end thereof rearwardly thereby compressing said resilient shock absorber means between said force transmitting means on said slidable sill at the forward end thereof and said combined force transmitting and resisting means whereupon said resilient shock absorber means serves to cooperate with said hydraulic shock absorber in absorbing the buff forces, and said coupler means in response to draft forces applied thereto effecting movement of said slidable sill forwardly causing said force transmitting means on said slidable sill at the rearward end thereof to engage said hydraulic cylinder collar means for moving said hydraulic cylinder and said combined force transmitting and resisting means associated therewith forwardly thereby compressing said resilient shock absorber means between said combined force transmitting and resisting means and said force resisting means whereupon said resilient shock absorber means serves to absorb the draft forces.

References Cited in the file of this patent
UNITED STATES PATENTS

| | | |
|---|---|---|
| 2,197,669 | Stephens | Apr. 16, 1940 |
| 2,766,894 | Campbell | Oct. 16, 1956 |
| 2,970,703 | Blattner | Feb. 7, 1961 |
| 3,028,019 | Settles et al. | Apr. 3, 1962 |
| 3,031,089 | Spencer et al. | Apr. 24, 1962 |